H. T. MAITLAND.
PROCESS OF REFINING LUBRICATING OILS.
APPLICATION FILED AUG. 5, 1915.
1,188,961.
Patented June 27, 1916.
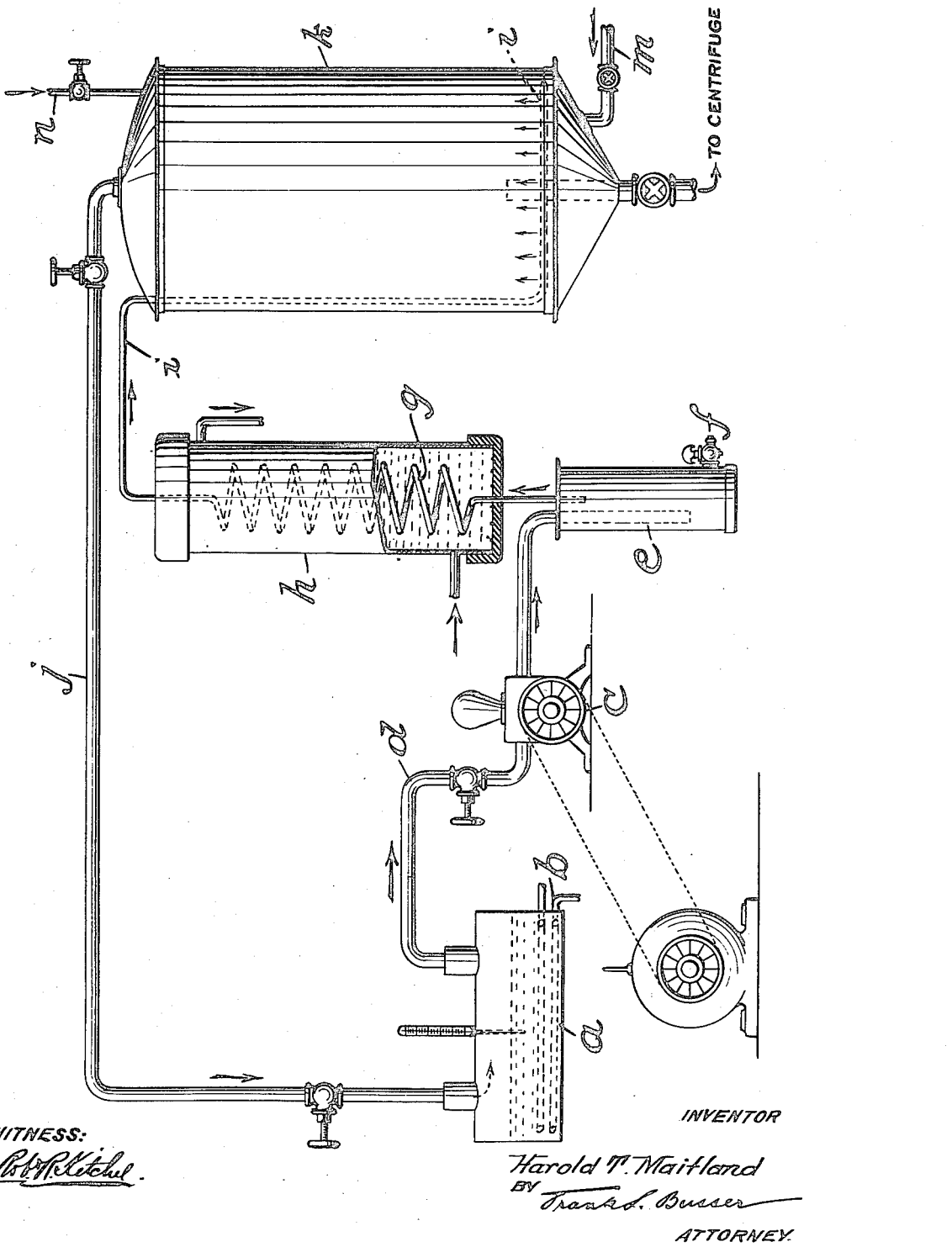
WITNESS:
INVENTOR
Harold T. Maitland
BY
Frank S. Busser
ATTORNEY.

UNITED STATES PATENT OFFICE.

HAROLD T. MAITLAND, OF MARCUS HOOK, PENNSYLVANIA, ASSIGNOR TO SUN COMPANY, OF PHILADELPHIA, PENNSYLVANIA, A CORPORATION OF NEW JERSEY.

PROCESS OF REFINING LUBRICATING-OILS.

1,188,961.  Specification of Letters Patent.  Patented June 27, 1916.

Application filed August 5, 1915. Serial No. 43,736.

*To all whom it may concern:*

Be it known that I, HAROLD T. MAITLAND, a citizen of the United States, residing at Marcus Hook, county of Delaware, and State of Pennsylvania, have invented a new and useful Improvement in Processes of Refining Lubricating-Oils, of which the following is a full, clear, and exact description.

My invention relates to the refining of lubricating oils and has for its more especial object the production of an oil of a color best adapted for sale as a commercial product.

In the refining of petroleum oil distillates, especially the lighter distillates adapted for illuminating purposes, it is customary to add to the same, sulfuric acid in an amount dependent upon the character of the distillate, thoroughly mix the oil and acid by agitation, and allow the mixture to settle. The result of this treatment is to cause the acid to combine with certain hydrocarbons and other compounds, the removal of which hydrocarbons and other compounds renders the remaining oil of greater purity and better color. The combined acid hydrocarbons and compounds then settle to the bottom of the tank, forming a sludge acid which is drawn off. The oil is then washed with water, which is then allowed to settle and is drawn off, the washing operation being repeated as often as is necessary. An alkali, usually caustic soda, is added to neutralize the acid and thus eliminate it, as fully as possible, from the oil, after which the oil may be again washed by agitating. Alkalis other than caustic soda have been used, and in the manufacture of illuminating oils and in the treatment of sludge, aqua ammonia and other alkaline substances have been mentioned in prior patents as substitutes for the caustic soda. The sulfuric acid process, followed by treatment with caustic soda, has also been applied to the refining of the heavier distillates and reduced distillates such as those adapted for lubricating purposes. But this treatment, as applied to lubricating oils, has not produced satisfactory results. The oil, after distillation, is much darker in color than the lighter distillates, due to the presence of comparatively large quantities of certain hydrocarbons and compounds which render the oil dark in color. After agitation with acid, the immediate effect of the sulfuric acid and its products of dissociation, chiefly sulfur dioxid ($SO_2$), is to darken the oil.

The darkening at the time of agitation with $H_2SO_4$ is due to the combination of sulfuric acid with certain hydrocarbons and other compounds, forming a finely divided precipitate known in the arts as resins, or sulfonic compounds. Owing to the finely divided condition of these resins it has heretofore been impossible to effect their complete removal by any known method. The usual method is to allow the oil containing these resins to remain in a state of quiescence in a settling container until a large part of the resins has been settled to the bottom of the container, from which they were drawn off by means of a pipe connected to the bottom of said container. The oil was then neutralized with caustic soda or some similar alkali and the process subsequently finished in much the same manner as previously cited in the treatment of the lighter distillates. This process necessitates the consumption of a considerable period of time between that of bringing the acid in contact with the oil and that of the drawing off of the resins before neutralization. During this period the oil is badly damaged in respect to its color by its prolonged standing in intimate contact, first, with that portion of the sulfuric acid which was not utilized in the above mentioned reaction; second, with certain products of dissociation of sulfuric acid; third, with the resins themselves. This process also necessitates the neutralizing of the oil by caustic soda or some other similar alkali while a large amount of the above mentioned resins still remain in the oil. These resins, which are themselves black in color, are redissolved into oil by this treatment, and the oil consequently considerably darkened.

The main object of my invention is to produce a lubricating oil of a lighter, clearer and more highly translucent color, which object I accomplish by preserving to a substantial degree the color that the oil would have if the beneficial effects of the addition of sulfuric acid could be retained without the discoloration which the acid produces during sedimentation and before neutralization. That is, I have discovered that if the collection and precipitation of the sulfonic compounds can be more thoroughly effected without sole reliance being placed upon the removal of the impurities by sedimentation immediately after the sulfuric acid treatment, the discoloration of the oil by the acid will be minimized. I have further discovered that the removal of these impurities can be accomplished by passing through the mixture of oil and acid, ammonia gas. Preferably the gas is passed through the mixture immediately after agitation and without previously allowing any sludge acid to form by precipitation. Nor should there be any intermediate washing with water. The process is also operative to effect, to some extent, the attainment of the results sought if such precipitate which readily forms after mixing is drawn off before the ammonia gas is introduced. If, however, before the ammonia gas treatment, the mixture of oil and acid is allowed to stand until precipitation has entirely ceased and the sludge acid then drawn off, the acid, dissociation products and resins will have acted during precipitation, as heretofore, to discolor the oils. It is not, therefore, desirable to delay the ammonia gas treatment until this stage of the process, but even if then applied, it will be of some advantage in that it will stop the discoloring action of the sulfur dioxid, will precipitate the remaining resins and prevent them from being dissolved in the oil and thus avoid a further loss of color.

Preferably the gas is introduced near the bottom of the oil tank, after which it is carried around and again passed through the liquid until absorption is completed, the process being thus a continuous one. The ammonia causes the particles of sulfonic compounds, or what is known in the art as resins, to become sticky and soapy and to coalesce into comparatively large units which are readily precipitated.

The amount of acid and ammonia gas to the given amount of oil cannot be fixed within narrow limits, inasmuch as these factors depend upon the character of the oil and the precise color which it is desired to obtain in the finished product. Thus to one barrel (42 gallons) of oil may be added from five to fifty pounds of sulfuric acid (say, by weight, from less than one per cent. to seven per cent. or over of the oil.) The agitation of the oil and acid should be continued for about an hour. The amount of ammonia gas will vary with what is required to collect all the resins, if it be desired to effect their complete removal. This amount will vary, by weight, from one eighth to one per cent. of the oil. In estimating the weight of the ammonia gas, I compressed the gas into a liquid and allowed the gas to evolve by removing the pressure. The difference between the weight of the liquid before and after the operation represented the weight of the gas. While the ammonia has, of course, a neutralizing action, the step involving its use is not a neutralizing step except incidentally, its main purpose being to preserve the color of the oil, which heretofore has not been accomplished by the alkaline treatment. While the precise reason why the avoidance or very material reduction of discoloration is accomplished cannot be stated with certainty, it is believed to be due, first, to the comparatively rapid and effectual neutralization of the sulfur dioxid liberated after the addition of the sulfuric acid, and second, to the collection and precipitation of all the resins and sulfonic compounds. Again, the addition of ammonia in quantities sufficient to effect the collection and precipitation of the resins is not sufficient to completely neutralize the acid and eliminate it from the oil and therefore it is necessary to follow the treatment just described by adding an alkali to the oil. For this purpose, caustic soda is satisfactory. Before the caustic soda is added the mixture of oil and acid, after the ammonia gas treatment, should be allowed to remain quiescent until precipitation is completed and the oil then drawn off.

Instead of using caustic soda or some other available and comparatively inexpensive alkali, it may be found entirely practicable and economical, owing to the saving of time and other considerations, to effect final neutralization by continuing the application of ammonia gas after its color preservative action has been completed, in which case it is not absolutely necessary to draw off the sulfonic compounds before neutralization. In other words, the color preservative step and the neutralizing step may merge one into the other, thereby simplifying and expediting the refining operation.

In the final step the oil is passed through a centrifuge to effect the elimination, as completely as is practicable or necessary, of the salts and soaps remaining in the oil. The same effect may be produced, in a less thorough manner and much less expeditiously, by settling. Or steam may be driven through the oil to boil off the water and the salts subsequently removed by centrifugal force or by settling.

Instead of using ammonia gas, aqua ammonia may be used, but with much less satisfactory results, and where ammonia gas is specifically claimed it is not to be understood that liquid ammonia is a full equivalent thereof.

While the process may be applied to a lubricating oil distilled from any crude oil, we have ordinarily employed a Texas crude oil having a weight of about 20½° Baumé gravity, when taken at 60° F. temperature. The special characteristics of this crude oil are its freedom from paraffin wax, the large percentage of asphaltic material, and the high viscosity oils which it contains. The crude oil is placed in a large still, under which fire is applied. Distillation of the lighter products then takes place, and later, at a higher temperature, the heavier products, or lubricating oils are distilled. It is this heavier product which is placed in the agitator hereinafter described, to which is added the amount of acid hereinbefore specified.

The execution of the process is not dependent on the employment of any particular apparatus, but the essential steps of the process may be conveniently carried out in an apparatus like that illustrated in the accompanying drawing, which is a diagram of the generator, the separator, the cooler, the agitator, and connections.

In the generator $a$ is placed the ammonia water which is heated to generate the ammonia gas by means of steam coils $b$. By means of a rotary pump $c$ and pipe connections $d$ the gas is drawn into a separating tank $e$, in which any water which has been carried over with the ammonia settles and is drawn off from time to time through a cock $f$ at the bottom of the tank. The ammonia gas is forced out of the top of the tank through a coil $g$ in a tank $h$ filled with water, which cools the ammonia gas and condenses any water therein, the water dropping down into the separating tank $e$. The ammonia gas then emerges from the top of the cooler and is forced over and down through a pipe $i$ the end of which extends into the bottom of the agitator and is provided with small perforations through which the gas escapes into the mixture of oil and acid in the agitator $k$. From the agitator any gas which has not been consumed, passes through the pipe $j$ back to the generator $a$, whence, together with other gases generated by the ammonia water, it passes again eventually to the agitator. The agitator may be provided at the bottom with a pipe connection $m$ to allow admission of air, and at the top with a pipe $n$ for the admission of acid.

While, to the extent hereinbefore stated, the employment of ammonia as an acid neutralizing agent and as a substitute for caustic soda in the treatment of illuminating oil distillates, is not unknown, and while even ammonia gas has been suggested for use in connection with sulfurous acid, as a substitute for sulfuric acid and caustic soda, and also as one of several alkalis that may follow the use of oxygen in the distillation of crude petroleum, it will be apparent, from the foregoing description, that not only do I specify the employment of ammonia gas in connection with the refining of a petroleum distillate in which the employment of ammonia in any form has not been heretofore suggested, and not only is the ammonia gas added for a purpose not heretofore contemplated, but it is added at such time and in such manner as to perform a function not heretofore performed by ammonia.

Where, in the claims, I use the term "ammonia", I do not intend to be confined to anhydrous ammonia or ammonia gas ($NH_3$).

It will be understood that in the treatment of petroleum distillates adapted for use as illuminating oils, the problem of minimizing discoloration does not arise, the only requirement being that the sulfuric acid shall be neutralized; and as ammonia and caustic soda both perform this function, they may be said to be equivalents. But in the treatment of lubricating oils the ammonia, even when added in quantities not sufficient to completely neutralize the acid, prevents or materially reduces discoloration, as hereinbefore explained, which is a function which caustic soda does not and cannot perform, and therefore caustic soda is not an equivalent of ammonia.

While I have spoken of the distillates adapted for illuminating oils and lubricating oils as respectively light and heavy, it will be understood that these terms are applicable only in comparing distillates from the same crude oil, it being well known that the distillates adapted for lubricating oils of some crude oils are as light as the distillates adapted for burning or illuminating oils of other crude oils. It is also well known that the quality of the distillate that adapts it for use in the manufacture of lubricating oils is its viscosity, which is measured by different known instruments. In more clearly defining the character of distillate to which my invention is applicable, it may be stated that its viscosity is not less than 60 when tested on a Saybolt instrument at a temperature of 70 degrees F.

Having now fully described my invention, what I claim and desire to protect by Letters Patent is:

1. The process of purifying those petroleum distillates and reduced petroleum distillates adapted for use as lubricating oils which consists in first treating the distillate with sulfuric acid, and then, without permitting complete settlement, subjecting the mixture to the action of ammonia to minimize the coloring effect of the acid in the subsequently finished product.

2. The process of purifying those petroleum distillates and reduced petroleum distillates adapted for use as lubricating oils which consists in first thoroughly mixing the distillate with sulfuric acid, and then, before permitting substantial settlement, subjecting the mixture to the action of ammonia to minimize the permanent coloring effect of the acid upon the oil.

3. The process of purifying those petroleum distillates and reduced petroleum distillates adapted for use as lubricating oils which consists in first treating the distillate with sulfuric acid, then, without permitting complete settlement, subjecting the oil to a color preservative action by the addition of ammonia, then allowing settlement and separating the precipitate, and then further neutralizing the acid by treating the oil with an alkali.

4. The process of purifying those petroleum distillates and reduced petroleum distillates adapted for use as lubricating oils which consists in first treating the distillate with sulfuric acid, and then, without permitting complete settlement, subjecting the mixture to the action of ammonia to collect the sulfonic compounds, thereby effecting their more complete ultimate removal, then allowing settlement and separating the precipitate, and then subjecting the oil to the action of an alkali to complete the neutralization of the acid.

5. The process of purifying those petroleum distillates and reduced petroleum distillates adapted for use as lubricating oils which consists in first treating the distillates with sulfuric acid, and then, without permitting complete settlement, subjecting the mixture to the action of ammonia gas.

6. The process of purifying those petroleum distillates and reduced petroleum distillates adapted for use as lubricating oils which consists in first thoroughly mixing the distillate with sulfuric acid, and then, before permitting substantial settlement, subjecting the mixture to the action of ammonia gas.

7. The process of purifying those petroleum distillates and reduced petroleum distillates adapted for use as lubricating oils which consists in adding to the distillate sulfuric acid and, before allowing substantial settlement, passing through the mixture ammonia gas, and then further neutralizing the acid by treating the oil with an alkali.

8. The process of purifying those petroleum distillates and reduced petroleum distillates adapted for use as lubricating oils which consists in first treating the distillate with sulfuric acid, then, without permitting complete settlement, passing through the mixture ammonia gas, and then subjecting the oil to the action of an alkali to complete the neutralization of the acid.

9. The process of purifying those petroleum distillates and reduced petroleum distillates adapted for use as lubricating oils which consists in first thoroughly mixing the distillates with sulfuric acid, then, without permitting any complete settlement, causing ammonia gas to pass through the mixture until the sulfonic compounds or resins are collected, then subjecting the oil to the action of an alkali, and then driving off the water and eliminating the salts suspended in the oil.

10. The process of purifying those petroleum distillates and reduced petroleum distillates adapted for use as lubricating oils which consists in first thoroughly mixing the distillate with sulfuric acid, then, without permitting any substantial amount of settlement, causing ammonia gas to pass through the mixture until the sulfonic compounds or resins are collected, then draining off the precipitate, and then completing neutralization by subjecting the oil to the action of caustic soda.

In testimony of which invention, I have hereunto set my hand, at Chester, on this 16th day of July, 1915.

HAROLD T. MAITLAND.

Witnesses:
J. HOWARD PEW,
F. M. BROWN.